(12) United States Patent
Sahin et al.

(10) Patent No.: US 12,465,623 B2
(45) Date of Patent: Nov. 11, 2025

(54) USE OF PARASITES AND EXTRACELLULAR VESICLES OBTAINED FROM PARASITES IN CANCER TREATMENT

(71) Applicant: YEDITEPE UNIVERSITESI, Istanbul (TR)

(72) Inventors: Fikrettin Sahin, Istanbul (TR); Zeynep Islek, Istanbul (TR); Ezgi Taskan, Istanbul (TR); Pakize Neslihan Tasli, Istanbul (TR); Batuhan Turhan Bozkurt, Istanbul (TR); Oguz Kaan Kirbas, Istanbul (TR); Mehmet Hikmet Ucisik, Istanbul (TR)

(73) Assignee: YEDITEPE UNIVERSITESI, Istanbul (TR)

(*) Notice: Subject to any disclaimer, the term of this patent is extended or adjusted under 35 U.S.C. 154(b) by 749 days.

(21) Appl. No.: 17/609,795

(22) PCT Filed: May 8, 2020

(86) PCT No.: PCT/TR2020/050406
§ 371 (c)(1),
(2) Date: Nov. 9, 2021

(87) PCT Pub. No.: WO2020/231372
PCT Pub. Date: Nov. 19, 2020

(65) Prior Publication Data
US 2022/0226393 A1 Jul. 21, 2022

(30) Foreign Application Priority Data
May 10, 2019 (TR) .................................. 2019/07085

(51) Int. Cl.
*A61K 39/00* (2006.01)
*A61K 35/68* (2006.01)
*A61K 39/008* (2006.01)
*A61K 39/39* (2006.01)
*A61P 35/00* (2006.01)

(52) U.S. Cl.
CPC ............ *A61K 35/68* (2013.01); *A61K 39/008* (2013.01); *A61K 39/39* (2013.01); *A61P 35/00* (2018.01); *A61K 2039/55588* (2013.01)

(58) Field of Classification Search
None
See application file for complete search history.

(56) References Cited

FOREIGN PATENT DOCUMENTS

| CN | 102988417 A | 3/2013 |
|---|---|---|
| EP | 1687025 A1 | 8/2006 |
| EP | 3279332 A1 | 2/2018 |
| WO | 2013089738 A1 | 6/2013 |

OTHER PUBLICATIONS

Castelli et al (Experimental Parasitology (Mar. 2019), 198, 39-45).*
Santarem et al (Journal of Proteomics. Jun. 2013. 84: 106-118).*
Jacques Ferlay, et al., Cancer incidence and mortality worldwide: Sources, methods and major patterns in GLOBOCAN 2012, International Journal of Cancer, 2015, pp. E359-E386, vol. 136.
Jessica J. Tao, et al., Long term side effects of adjuvant chemotherapy in patients with early breast cancer, The Breast, 2015, pp. S149-S153, vol. 24.
Vanessa D. Atayde, et al., A recombinant protein based on Trypanosoma cruzi surface molecule gp82 induces apoptotic cell death in melanoma cells, Melanoma Research, 2008, pp. 172-183, vol. 18, No. 3.
V. D. Kallinikova, et al., Anticancer Properties of Flagellate Protozoan Trypanosoma cruzi Chagas, 1909, Biology Bulletin, 2001, pp. 244-255, vol. 28, No. 3.
Ju-Ock Kim, et al., Inhibition of Lewis Lung Carcinoma Growth by Toxoplasma gondii through Induction of Th1 Immune Responses and Inhibition of Angiogenesis, J Korean Med Sci, 2007, pp. 38-46, vol. 22.
Nandy C. Lopez, et al., Antiangiogenic and Antitumor Effects of Trypanosoma cruzi Calreticulin, PLoS Neglected Tropical Diseases, Jul. 2010, pp. 1-9, vol. 4, Issue 7, e730.
GR. Roskin, et al., Protozoal infection and experimental cancer, Z Krebsforsch, 1931, pp. 628-645.
Jason R. Baird, et al., Immune-Mediated Regression of Established B16F10 Melanoma by Intratumoral Injection of Attenuated Toxoplasma gondii Protects against Rechallenge, The Journal of Immunology, 2013, pp. 469-478, vol. 190.
Dipayan Bose, et al., Heat Killed Attenuated Leishmania Induces Apoptosis of HepG2 Cells Through ROS Mediated p53 Dependent Mitochondrial Pathway, Cellular Physiology and Biochemistry, 2016, pp. 1303-1318, vol. 38.
Y Yang, et al., Exosomes from Plasmodium-infected hosts inhibit tumor angiogenesis in a murine Lewis lung cancer model, Oncogenesis, 2017, pp. 1-12, vol. 6, e351.
Clotilde Théry, et al., Exosomes: Composition, Biogenesis and Function, Nature Reviews Immunology, 2002, pp. 569-579, vol. 2.
Christoph Kahlert, et al., Exosomes in tumor microenvironment influence cancer progression and metastasis, J Mol Med, 2013, pp. 431-437, vol. 91.
A. Clayton, et al., Exosomes in tumour immunity, Current Oncology, 2009, pp. 46-49, vol. 16, No. 3.
Aled Clayton, et al., Cancer Exosomes Express CD39 and CD73, Which Suppress T Cells through Adenosine Production, The Journal of Immunology, 2011, pp. 676-683, vol. 187.
Bruno Costa-Silva, et al., Pancreatic cancer exosomes initiate pre-metastatic niche formation in the liver, Nature Cell Biology, 2015, pp. 816-826, vol. 17, No. 6.

(Continued)

Primary Examiner — Jennifer E Graser
(74) Attorney, Agent, or Firm — Dennemeyer & Associates LLC

(57) ABSTRACT

Use of parasites and extracellular vesicles obtained from the parasites for a cancer treatment is provided. The use of parasites and extracellular vesicles obtained from parasites is for using in a treatment of a cancer, and loading an active substance on exosomes by using a drug loading capacity of exosomes, and thus, by carrying a specific drug directly to target cancer cells without causing any side effect on healthy cells and to enhance a bioavailability of the specific drug, achieving a desired effect in a tumor specific target region. Particularly *Leishmania infantum* parasite is used as a source for the extracellular vesicles.

10 Claims, 10 Drawing Sheets

(56) References Cited

OTHER PUBLICATIONS

Jong-Kuen Lee, et al., Exosomes Derived from Mesenchymal Stem Cells Suppress Angiogenesis by Down-Regulating VEGF Expression in Breast Cancer Cells, PLOS One, 2013, pp. 1-11, vol. 8, Issue 12, e84256.

Sophie Viaud, et al., Dendritic Cell-Derived Exosomes for Cancer Immunotherapy: What's Next?, Cancer Research, 2010, pp. 1281-1285, vol. 70, No. 4.

Stefania Raimondo, et al., Citrus limon-derived nanovesicles inhibit cancer cell proliferation and suppress CML kenograft growth by inducing TRAIL-mediated cell death, Oncotarget, 2015, pp. 19514-19527, vol. 6, No. 23.

Hossein Yousofi Darani, et al., Parasites and cancers: parasite antigens as possible targets for cancer immunotherapy, Future Oncology, 2012, pp. 1529-1535, vol. 8, No. 12.

Alberto Benito-Martin, et al., The new deal: a potential role for secreted vesicles in innate immunity and tumor progression, Frontiers in Immunology, 2015, pp. 1-13, vol. 6 Article 66.

* cited by examiner

USE OF PARASITES AND EXTRACELLULAR VESICLES OBTAINED FROM PARASITES IN CANCER TREATMENT

CROSS REFERENCE TO THE RELATED APPLICATIONS

This application is the national stage entry of International Application No. PCT/TR2020/050406, filed on May 8, 2020, which is based upon and claims priority to Turkish Patent Application No. 2019/07085, filed on May 10, 2019, the entire contents of which are incorporated herein by reference.

TECHNICAL FIELD

The present invention relates to use of parasites and extracellular vesicles obtained from parasites for purposes of cancer treatment.

BACKGROUND

Cancer is one of the most dangerous and common diseases of the present day. It is estimated that 14.1 million new cancer cases occurred in 2012 in the world [1]. Although many different chemical and biological agents have been tried in cancer treatment, the developed treatment methods are insufficient due to their low efficacy and high side effects. For example, chemotherapy is the most frequently used treatment method in many types of cancer such as breast cancer, but it causes serious damage to many healthy tissues in the body such as bone marrow, hair and digestive system [2]. The inadequacy of treatment methods has forced scientists to try new methods in the field of cancer. Among these trials, exosomes promise effective results.

The term "neoplastic diseases" used in the scope of the present application refers to malignant tumors or a physiological condition characterized by uncontrolled cell growth, such as cancer. In this context, the terms "neoplastic disease" and "cancer" can be used interchangeably. Examples of cancer include, but are not limited to, carcinoma, lymphoma, blastoma sarcoma and leukemia.

Carcinoma, as used herein, refers to a type of cancer that consists of epithelial cells.

Lymphoma, as used herein, describes a type of cancer that develops from lymphocytes.

Blastoma, as used herein, describes a type of cancer that develops from precursor cells, also known as blast cells.

Sarcoma, as used herein, describes the type of cancer that arises from transformed cells of mesenchymal origin.

Leukemia, as used herein, describes the type of cancer that begins in the bone marrow and results in high numbers of abnormal white blood cells.

More specific examples of cancer types include breast cancer, prostate cancer, colorectal cancer, skin cancer, small cell lung cancer, non-small cell lung cancer, mesothelioma, gastrointestinal cancer, pancreatic cancer, glioblastoma, vulva cancer, cervical cancer, endometrial carcinoma, ovarian cancer, liver cancer, hepatoma, bladder cancer, kidney cancer, salivary gland carcinoma, thyroid cancer and various head and neck cancers.

Surgical operations and/or chemotherapy are frequently used to treat cancer. While surgical operation yields a complete and effective outcome in some cases; usually, a chemotherapeutic drug is administered after the operation against the possibility of presence of cancerous cells that will survive and trigger cancer formation in the long term. Mostly, chemotherapy causes a number of side effects by damaging the healthy cells as well as the cancerous cells. Cells with high proliferation rates in the body are most affected by chemotherapy, which are the hair cells, blood cells produced in the bone marrow and the digestive system cells.

The side effects frequently observed after chemotherapy are as follows:

Fatigue: Although it is mostly caused by the anemia resulting from the fact that the blood cells are affected, the cause may also be psychological.

Nausea and Vomiting: While it may be due to sensitivity to the drugs, it may also have psychological causes.

Hair Loss: Loss of hair which is particularly adversely affected by chemotherapy due to its rapid growth is one of the most significant reasons for the patients to get depressed.

Decrease of Blood Values: The bone marrow getting affected by chemotherapy results in a significant decrease in blood cells. Since sufficient amount of oxygen cannot be supplied to the tissues as a result of this decrease, many adverse effects such as weakening of the immune system and difficulty in blood clotting can be observed.

Mouth sores: Chemotherapy drugs may sometimes cause inflammatory sores in the mouth. During the treatment, the patients should avoid extremely hot or cold drinks and pay utmost attention to their oral hygiene.

Diarrhea or Constipation: Diarrhea or constipation can be observed as a result of the response of the cells of the digestive system against different chemotherapeutic agents. This situation, whose effects can mostly be reduced via diet, may in some cases result in severe diarrhea requiring intravenous fluid intake.

Skin and Nail Changes: Chemotherapeutic drugs have side effects such as darkening of the skin color, skin peeling, reddening or dry skin. Easy breakage of nails or darkening of their color can also be observed. Particular attention should be paid to peeling of the skin, as it will cause open wounds in immunocompromised patients.

Sleeping Problems: Although it usually occurs due to psychological reasons, failure of the body to rest particularly during chemotherapy treatment process both reduces the effect of chemotherapy and further disrupts the mental health of the patient.

In order to increase the success of the treatment, the requirement to use chemotherapy in combination with both surgical and other methods and the abundance and unpredictability of its side effects varying from patient to patient have led scientists to seek new treatment methods.

Nauts et al. (1953) have shown that microorganisms can induce antitumor response. They worked on the idea that non-pathogenic organisms, attenuated or genetically modified, could be used as antitumor agents [3]. They found that *Toxoplasma gondii* and *Acanthamoeba castellanii* exhibited antitumor activity. In the light of these developments, a new treatment field has emerged in oncology with the microorganisms, and research and development studies have been carried out under the name of "Biotherapy" which was used for the first time in 1931.

Baird et al. (2013) used the attenuated *Toxoplasma gondii* parasite in the treatment of B16F10 murine melanoma and demonstrated that a strong CD8+T cell-induced antitumor response occurred in mice that were given *Toxoplasma gondii* [9].

Bose et al. (2016) have concluded in their study that heat-attenuated *Leishmania donovani* induces apoptosis of HepG2 liver cancer cells through reactive oxygen species (ROS) mediated p53 dependent mitochondrial pathway [10].

Yang et al. (2017) tested exosomes isolated from *Plasmodium*-infected mice in the Lewis lung cancer model and observed that it inhibits tumor angiogenesis [11].

Due to their employability in targeting by carrying the cargo content specific to the cell from which they are obtained, exosomes have become prominent in the studies commenced in order to improve the current treatment methods and reduce the side effects.

Extracellular vesicles are small sacs which are involved in intercellular transport of substances and are separated by at least one lipid bilayer from the cytoplasm fluid. Exosomes, which are one of the extracellular vesicles, are vesicles which are released by many organisms such as high eukaryotes and plants, and which contain lipid bilayer membranes of different sizes. The importance of these vesicles lies behind the capacity of transferring information to the other cells in order to influence the cell function. Signal transfer via exosomes is carried out by means of biomolecules in many different categories consisting of proteins, lipids, nucleic acid and sugars [12]. Because they carry the surface proteins of the cell from which they are produced, exosomes target the type of cell in which they are delivered in in vivo systems. These properties make exosome suitable for carrying nucleic acids for drug, bioactive substance and gene therapy. Another distinctive aspect of the exosomes is that they are specific to the cell wherein the signals and cargos they carry are produced and to the current physiological conditions of the cell. Exosomes of different organisms, exosomes of different types of cells of the same organism, and exosomes of the same cell in different conditions show different properties.

Each cell produces exosomes for its own purposes. It has been discovered that the cancer cells, with the exosomes they produce, create a favorable environment for themselves in the body [13], escape from the immune system [14, 15] and make use of exosomes for metastasis [16]. Stem cell exosomes [17] and especially the exosomes of dendritic cells which are immune system cells [18, 19] have many activities in the body's response to cancer. Another source of exosomes that yield successful results is plants. The exosomes obtained from lemon have been successfully used on chronic myeloid leukemia model for treatment purposes [20].

All eukaryotic cells produce their own exosomes, including eukaryotic parasites. Leishmaniasis is a common name given to a group of vector-borne diseases that are transmitted to humans by the bite of female sandflies infected with *Leishmania protozoan* parasites. According to the World Health Organization, leishmaniasis is widely seen in more than 60 countries worldwide especially in the Southern European, Middle Eastern and North African countries, including Turkey and the surrounding geography.

The European patent document no. EP1687025, an application known in the art, discloses a vaccine composition comprising interleukin-18 and a saponin adjuvant. It was determined that the combination therapy disclosed within the scope of the said invention was useful in the treatment or prophylaxis of infectious diseases, cancers, autoimmune diseases and related conditions.

The Chinese patent document no. CN102988417, an application known in the art, discloses use of helminthic parasite biological agents for preventing and controlling diseases. These parasite preparations affect a regulatory T cell function. A disease is treated by altering a regulatory T cell activity through the administration of a parasite preparation. Examples of the diseases treated by this method are shown as Th1 or Th2-associated cancers.

SUMMARY

The objective of the present invention is use of parasites and extracellular vesicles obtained from parasites in treatment of cancer. Parasite exosomes directly induce response in the cancer cells without causing side effects on healthy cells. In addition, active substances can be loaded on exosomes by using the drug loading capacity of exosomes, and thus, by carrying specific drug to the target cell and thereby enhancing bioavailability of the drug, the desired effect is achieved in the tumor specific target region. Within the scope of the invention, particularly *Leishmania infantum* parasite is used as a source for extracellular vesicles (exosomes).

BRIEF DESCRIPTION OF THE DRAWINGS

The "Use of parasites and extracellular vesicles obtained from parasites in treatment of cancer" developed to fulfill the objectives of the present invention is illustrated in the accompanying figures, in which.

DETAILED DESCRIPTION OF THE EMBODIMENTS

Figure 1:
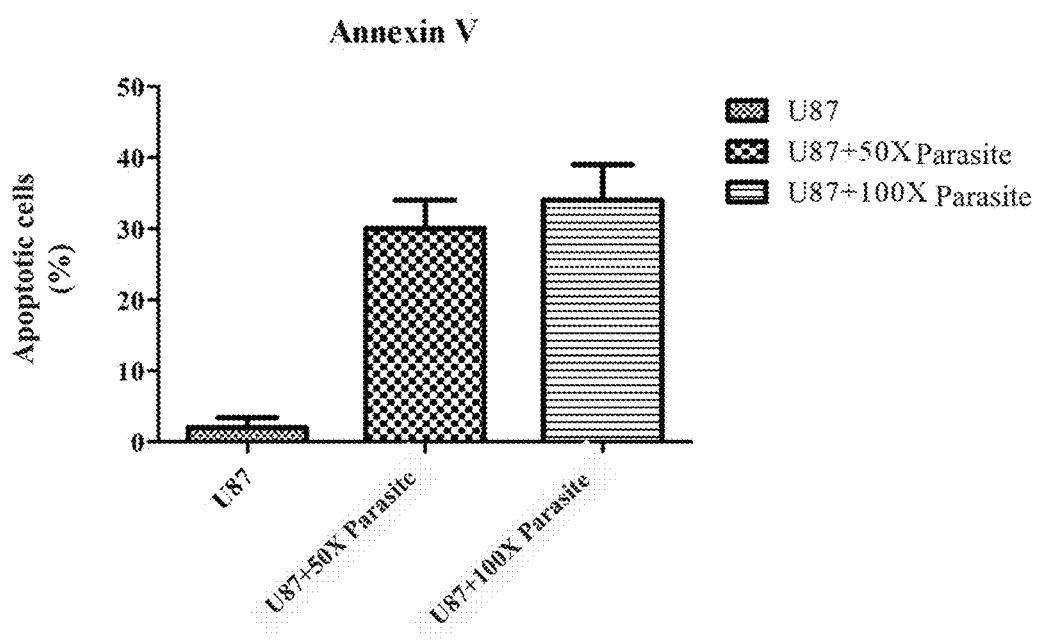
FIG. 1 is a graphical representation of the apoptotic effect of incubation of *Leishmania infantum* parasites together with the U87 cells in two different doses on the cells.

The present invention is use of parasites and extracellular vesicles obtained from parasites in treatment of neoplastic diseases. The term "neoplastic diseases" refers to malignant tumors or a physiological condition characterized by uncontrolled cell growth and points out to cancer. Within the scope of the invention, the terms "neoplastic disease" and "cancer" can be used interchangeably. The neoplastic disease can be at least one type of cancer selected from the group including breast cancer, prostate cancer, colorectal cancer, skin cancer, small cell lung cancer, non-small cell lung cancer, mesothelioma, gastrointestinal cancer, pancreatic cancer, sarcoma, blastoma, lymphoma, glioblastoma, neuroblastoma, vulva cancer, cervical cancer, endometrial carcinoma, ovarian cancer, liver cancer, hepatoma, leukemia, bladder cancer, kidney cancer, salivary gland carcinoma, thyroid cancer and various head and neck cancers. Within the scope of the invention, cancer treatment is carried out in the form of killing U87 cancer cells and A172 cancer cells which are glioblastoma cell lines, SHSY-5Y cancer cells which are neuroblastoma cell lines, SH4 cancer cells which are melanoma cell lines and 22RV cancer cells which are prostate cell lines.

The invention addresses the use of *Leishmania* parasites and extracellular vesicles obtained from the parasites in the treatment of cancer as they selectively kill cancer cells.

When developing the invention, it has been observed that the parasites and extracellular vesicles obtained from the parasites are highly fatal to cancer, but have virtually no side effects on healthy cells.

Within the scope of the invention, it will be possible to load active substances on exosomes by using the drug loading capacity of exosomes and to carry target cell-specific drug and thus to enhance bioavailability of the drug and achieve the desired effect in the target region.

The distinguishing feature of the invention is the use of exosomes isolated from *Leishmania* parasite in the treatment of cancer. In the studies mentioned under the title of background of the invention, direct use of parasites is a serious obstacle to the use of the parasites in the treatment because they cause diseases. As for the present invention, by using exosomes isolated from the parasites, the possible risk of diseases in the direct use of parasites is prevented.

In the present invention, various parasites including *Leishmania infantum* parasite and the exosomes obtained from the parasites are used in cancer treatment. Within the scope of the invention, the parasites used herein comprise the following species: *Acanthamoeba* sp. (*Acanthamoeba castellanii*), *Echinocococcus* spp., *E. histolytica* spp., *Ancylostoma brazilense*, *A. caninum*, *A. ceylanicum*, and *Uncinaria stenocephala*, *Angiostrongylus cantonensis*, *Ascaris*, *Giardia*, *Leishmania* spp. (*L. Arabica, L. archibaldi, L. aristedesi, L. braziliensis, L. chagasi, L. colombiensis, L. Deanei, L. donovani, L. enrietii, L. equatorensis, L. forattinii, L. garnhami, L. gerbil, L. guyanensis, L. herreri, L. hertigi, L. infantum, L. killicki, L. lainsoni, L. major, L. Mexicana, L. naiffi, L. panamensis, L. peruviana, L. pifanoi, L. shawi, L. tarentolae, L. tropica, L. turanica, L. venezuelensis*), *Plasmadium* spp. (*P. falciparum, P. vivax, P. ovale*), *Schistosoma* spp., *Toxoplasma* spp. (*Toxoplasma gondii*), *Trypanosoma brucei* ssp. The scope of the invention involves use of extracellular vesicles obtained from one or more of these species separately or combined, where the latter allows the exosomes obtained from the different parasites to expose mutual effect in cancer treatment.

Within the scope of the invention, *Leishmania infantum* is selected as the parasite for characterizing the extracellular vesicles obtained from the parasites. Its use in cancer treatment can be the culture medium of parasites.

Within the scope of the invention, parasites and extracellular vesicles obtained from parasites, whose parasite antigens (heat-inactivated or directly the antigen itself), genetic material (mRNA, small RNA, mitochondrial DNA, DNA fragments), gene transferred and transfected parasites (plasmid transfer, lentiviral, electroporation with SV40 antigen) are used for CRISPR (methods comprising nucleotide editing) cancer treatment. These are used in cancer treatment upon being encapsulated into nano-carrier systems.

Within the scope of the present invention, isolation of parasites and extracellular vesicles obtained from parasites is carried out by using at least one of the following isolation methods: isolation with aqueous two-phase systems (ATPS), graduated centrifuge, ultracentrifuge, sucrose gradient ultracentrifuge, polymeric precipitation, ultrafiltration, isolation with chromatographic methods (affinity chromatography (antibody and peptide affinity), size separation chromatography (size exclusion chromatography)), isolation with microbeads and precipitation according to ionic charge (electrical charge-based precipitation) and salting. The two-phase liquid isolation method preferred within the scope of the invention comprises the steps of collecting culture media of the parasite from which the extracellular vesicles will be isolated, centrifuging at a rate of 2,000 g to 10,000 g for 5-20 minutes for removal of the desirable substances such as cell residues and parasites from the culture media, removing the particles of size 220 nm and above by filtration after centrifugation, transferring the vesicle-protein mixture obtained by centrifugation into a two-phase liquid system containing PEG phase and DEX phase for separation thereof, removing the non-vesicular proteins, cellular fat and other impurities from the vesicles by utilizing the chemical tendency of the PEG phase to the proteins and the DEX phase to the phospholipid structured membranes, obtaining the isolated vesicles.

A formulation developed within the scope of the present invention and containing parasites and extracellular vesicles obtained from parasites comprises nano-carrier systems selected from a group comprising vesicles, emulsion systems, biological and chemical nanoparticles (polymeric nanoparticles, solid lipid nanoparticles), inorganic nanoparticles (metallic nanoparticles), lipid vesicular systems (liposomes, niosomes and ethosomes), dendrimers, polymer-drug conjugates, micelles and carbon nanotubes. This formulation comprises at least one active compound selected from a group comprising active compounds showing antiparasitic, antibacterial, antiviral, antineoplastic and/or cytotoxic and/or antimetastatic activity, and binary and ternary combinations thereof as a further active substance. This formulation comprises at least one agent selected from a group comprising amikacin, gentamycin, kanamycin, neomycin, netilmicin, tobramycin, paromomycin, streptomycin, spectinomycin, geldanamycin, herbimycin, rifaximin, loracarbef, ertapenem, doripenem, imipenem, meropenem, cephadroxyle, cefazolin, cephalothin, cephalexin, cephaclor, cefamandole, cefoxitin, cefprozil, cefuroxime, cefixime, cefdinir, cefditoren, cefoperazone, cefotaxime, cefpodoxime, ceftazidime, ceftibuten, ceftizoxime, cefepime, ceftaroline fosamil, ceftobiprole, teicoplanin, vancomycin, televancin, dalbavancin, oritavancin, clindamycin, lincomycin, daptomycin, azitromycine, claritromycin, diritromycin, erythromycin, roxithromycin, troleandomycin, telithromycin, spiramycin, aztreonam, furazolidone, nitrofurantoin, linezolid, posizolid, radezolid, torezolid, amoxicillin, ampicillin, azlocillin, carbenicillin, cloxacillin, dicloxacillin, flucloxacillin mezlocillin, methicillin, nafcillin, oxacillin, penicillin G, penicillin V, piperacillin, temocillin, ticarcillin, clavulanate, sulbactam, tazobactam, bacitracin, colistin, polymyxin B, ciprofloxacin, enoxacin, gatifloxacin, gemifloxacin, levofloxacin, lomefloxacin, moxifloxacin, nalidinic acid, norfloxacin, ofloxacin, trovafloxacin, grepafloxacin, sparfloxacin, temafloxacin, mafenide, sulfacetamide, sulfadiazine, sulfadimethoxine, sulfamethizole, sulfamethoxazole, sulfanilamide, sulfasalazine, sulfisoxazole, trimethoprim, demeclocycline, doxycycline, minocycline, oxytetracycline, tetracycline, clofazimine, dapsone, capreomycin, cycloserine, ethambutol, isoniazid, pyrazinamide, rifampicin, rifabutin, rifapentine, streptomycin, arsphenamine, chloramphenicol, phosphomycin, fusidic acid, metronidazole, mupirocin, platensimycin, quinupristin, dalfopristin, thiamphenicol, tigecycline, tinidazole, trimethoprim, and binary or ternary combinations and/or encapsulations thereof as an active compound showing antibacterial activity. This formulation comprises at least one agent selected from the group comprising abacavir, acyclovir, adefovir, amantadine, amprenavir, ampligen, arbidol, atazanavir, atripla, balavir, sidofovir, kombivir, dolutegravir, darunavir, delavirdin, didanosine, docosanol, eduksudine, efavirenz, etntricitabine, enftivirtide, entecavir, ecoliver, famciclovir, fomivirsen, fosamprenavir, foscarnet, phosphonet, ganciclovir, ibasitabin, imunovir, idoxuridine, aniquimod, indinavir, inosine, interferon type I, interferon type II, interferon type III, interferon, lamivudine, lopinavir, lovirid, maravirok, moroxidine, methisazone, nelfinavir, nevirapine, nexavir, nitazoxanide, novir, oseltamivir, peginterferon alfa-2a, pensiclovir, peramivir, plekonaril, podofilotoxin, protease inhibitor, nucleoside analogues, ralgetavir, ribavirin, rimantadine, ritonavir, pyramidine, saquinavir, sofosbuvir, stavudine, telaprevir, tenofovir, tipranavir, trifluridine, trisivir, tromantadine, trovada, valaciclovir, valganciclovir, vidarabine, viramidine, zalcitabine, zanamivir, zidovudine, and binary or ternary combinations and/or encapsulations thereof as an active compound showing antiviral activity. This formulation comprises at least one agent selected from a group comprising nitazoxanide, melarsoprol, eflornithine, metronidazol, tinidazole, miltefosine, mebendazole, pyrantel pamoate, thiabendazole, diethylcarbamazine, ivermectin, niclosamide, praziquantel, albendazole, rifampin, amphotericin B, fumagillin, furazolidone, nifursemizone, nitazoxanide, ornidazole, paromomycin sulfate, pentamidine, pirimethamine, tinidazole, albendazole, mebendazole, thiabendazole, fenbendazole, triclabendazole, flubendazole, abamectin, diethylcarbamazine, ivermectin, suramin, pyrantel pamoate, levamisole, niclosamide, nitazoxanide, oxyclozanide, monepantel, derquantel, amphotericin B, urea stibamine, sodium stibogluconate, meglumine antimoniate, paromomycin, miltefosine, fluconazole, pentamidine, and binary or ternary combinations and/or encapsulations thereof as an active compound showing antiparasitic activity. This formulation comprises at least one agent selected from a group comprising cyclophosphamide, ifosfamide, temozolomide, capecitabine, 5-fluorouracil, methotrexate, gemcitabine, pemetrexed, mitomycin, bleomycin, epirubicin, doxorubicin, etoposide, paclitaxel, irinotecan, docetaxel, vincristine, carboplatin, cisplatin, bevacizumab, cetuximab, gefitinib, imatinib, trastuzumab, denosumab, rituximab, sunitinib, zoledronate, abiraterone, anastrozole, bicalutamide, exemestane, goserelin, medroxyprogesterone, octreotide, tamoxifen, bendamustine, carmustine, chlorambucil, lomustine, melphalan, procarbazine, streptozocin, fludarabine, raltitrexed, actinomycin D, dactinomycin, doxorubicin, mitoxantrone, eribulin, topotecan, vinblastine, vinorelbine, afatinib, aflibercept, crizotinib, dabrafenib, interferon, ipilimumab, lapatinib, nivolumab, panitumumab, pembrolizumab, pertuzumab, sorafenib, trastuzumab emtansine, temsorilimus, vemurafenib, ibandronic acid, pamidronate, bexarotene, buserelin, cyproterone, degarelix, folinic acid, fulvestrant, lanreotide, lenalidomide, letrozole, leuprorelin, megestrol, mesna, thalidomide, vincristine, and binary or ternary combinations and/or encapsulations thereof as an active compound showing antineoplastic activity in combination with extracellular vesicles and/or nano-carrier systems. Furthermore, this formulation comprises at least one active substance. The active substance comprises the above defined and listed substances.

The method of administration of this above described pharmaceutical composition for treatment comprises at least one method of administration selected from a group comprising parenteral, intravenous, intradermal, subcutaneous, intraperitoneal, topical, intrathecal, intranasal, intracerebroventricular, ocular, vaginal, urethral, transdermal, sublingual, subarachnoid, rectal, periodontal, perineural, peridural, periarticular, oral, intratympanic, intratumor, intrapulmonary, intrasynovial, intramuscular, intraovarian, intrameningeal, intracorporus cavernosum, intracoronary, intracerebral, epidural, cutaneous, buccal, dental.

Extracellular vesicles are used as adjuvants for cancer treatment within the scope of the invention. The pharmaceutical composition disclosed within the scope of the invention can be formed by incorporating extracellular vesicles obtained from parasites into at least one of aluminum hydroxide, aluminum phosphate, tocopherol, emulsion systems containing 3D-MPL, cholesterol, CG oligonucleotide; or combinations of two or more of them.

The production of parasites and parasite extracellular vesicles that can be used in cancer treatment for the purpose of the invention includes the following steps.

1. Culturing of the Parasites

*Leishmania infantum* (MHOM/MA/67/ITMA-P263) promastigotes are incubated at 27° C. in RPMI medium (with heat inactivated 10% fetal bovine serum, 2 mM L-glutamine, 20 mM HEPES, 100 U/ml penicillin, 100 µg/ml streptomycin). Parasites reaching the logarithmic phase ($10^6$/ml) are made infective.

2. Treatment of Cultured Parasites with Glioblastoma Cancer and Measuring the Amount of Apoptosis via Annexin V Assay The prepared parasites are added onto glioblastoma U87 cells in culture medium. The parasites applied in 2 different doses (50 and 100-fold U87 cells) are incubated for 8 hours and subsequently the parasites on the U87 cells are removed. The next day, upon adding Annexin V solution, the mortality rate is measured by a flow cytometry device.

3. Collecting Parasite Media

Within the scope of the invention, the parasite extracellular vesicles are isolated by an isolation method selected from the group consisting of isolation by two phase liquid system, graduated centrifuge, ultrafiltration, chromatographic methods, polymer-based isolation and isolation by microbeads. Among them, the purest extracellular vesicle isolation is achieved by isolation with two-phase liquid system and therefore this isolation method is preferred within the scope of the present application.

The method of isolation via two phase liquid system used for isolation of the parasite extracellular vesicles used within the scope of the present invention comprises the following steps:
- collecting culture media of the parasite from which the extracellular vesicles will be isolated,
- centrifuging at a rate of 2,000 g to 10,000 g for 5-20 minutes for removal of the undesirable substance such as cell residues and parasites from the culture media,
- removing the particles of size 220 nm and above by filtration after centrifugation,
- transferring the vesicle-protein mixture obtained by centrifugation into a two-phase liquid system containing PEG phase and DEX phase for separation thereof,
- removing the non-vesicular proteins, cellular fat and other impurities from the vesicles by utilizing the chemical tendency of the PEG phase to the proteins and the DEX phase to the phospholipid structured membranes,
- obtaining the isolated vesicles.

4. MTS

After the cells were seeded in 96-well culture plates (Corning Glasswork, Corning, N.Y.) at 5000 cells/well in Dulbecco's modified Eagle's medium (DMEM) containing 10% fetal bovine serum (Invitrogen) and 1% PSA (Biological Industries, Beit Haemek, Israel) in the culture medium, the viability levels of the cells were measured on day 1, 2 and 3. Cell viability was measured by using 3-(4,5-dimethyl-thiazol-2-yl)-5-(3-carboxy-methoxy-phenyl)-2-(4-sulfo-phenyl)-2H-tetrazolium (MTS)-method (CellTiter96 Aqueous One Solution; Promega, Southampton, UK). 10 µl MTS solution was added onto the cells within a 100 µl growth medium and they were incubated in dark for 2 hours. After the incubation process, cell viability was observed by performing absorbance measurement via ELISA plate reader (Biotek, Winooski, Vt.) device at 490 nm wavelength.

5. Quantitative Real Time Polymerase Chain Reaction (RT-PCR)

The day after the cells were seeded in 96-well culture plates (Corning Glasswork, Corning, N.Y.) at 150,000 cells/well in Dulbecco's modified Eagle's medium (DMEM) containing 10% fetal bovine serum (Invitrogen) and 1% PSA (Biological Industries, Beit Haemek, Israel) in the culture medium, the cells were incubated with various doses (10-40 ug/ml) of parasite exosome, and 3 and 48 hours following the incubation, p21, p53, caspase 3, Bcl-2 and Bax gene expressions were observed in the cells. In sum, RNA isolation was performed on the cells using Trizol®, total RNA concentrations were measured via NanoDrop spectrophotometry and then cDNA analysis was performed using cDNA kit (Roche). RT-PCR was performed at 95° C. for 15 min, followed by 39 cycles at 95° C. for 15 s, 58° C. for 1 min and 72° C. for 30 s using SYBR Green Kit (Thermofisher scientific). GAPDH was used as the housekeeping gene.

Figure 2:
FIG. 2 is a view of the light microscope photograph showing the parasite infection after 8 hours following incubation of the U87 cells in a culture medium with the parasites.
Figure 3:
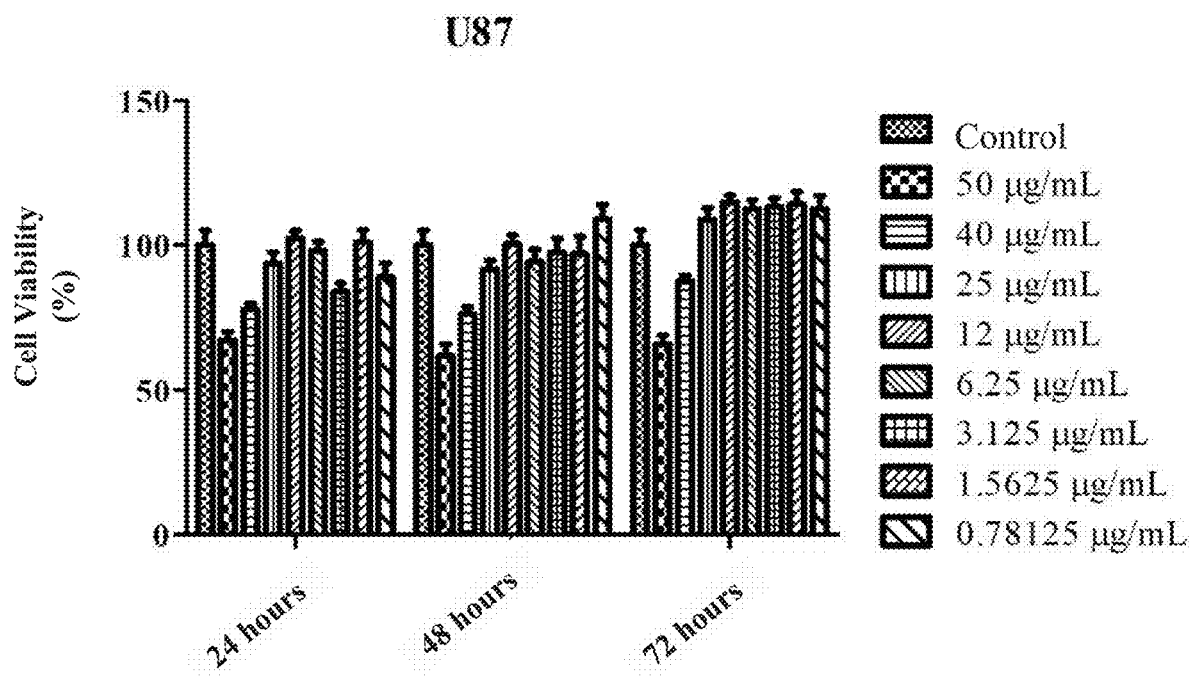
FIG. 3 is a graphical representation of the effect of the exosomes obtained from the *Leishmania infantum* parasites on the cell viability of the U87 cells administered for 24, 48 and 72 hours in 8 different doses.
Figure 4:
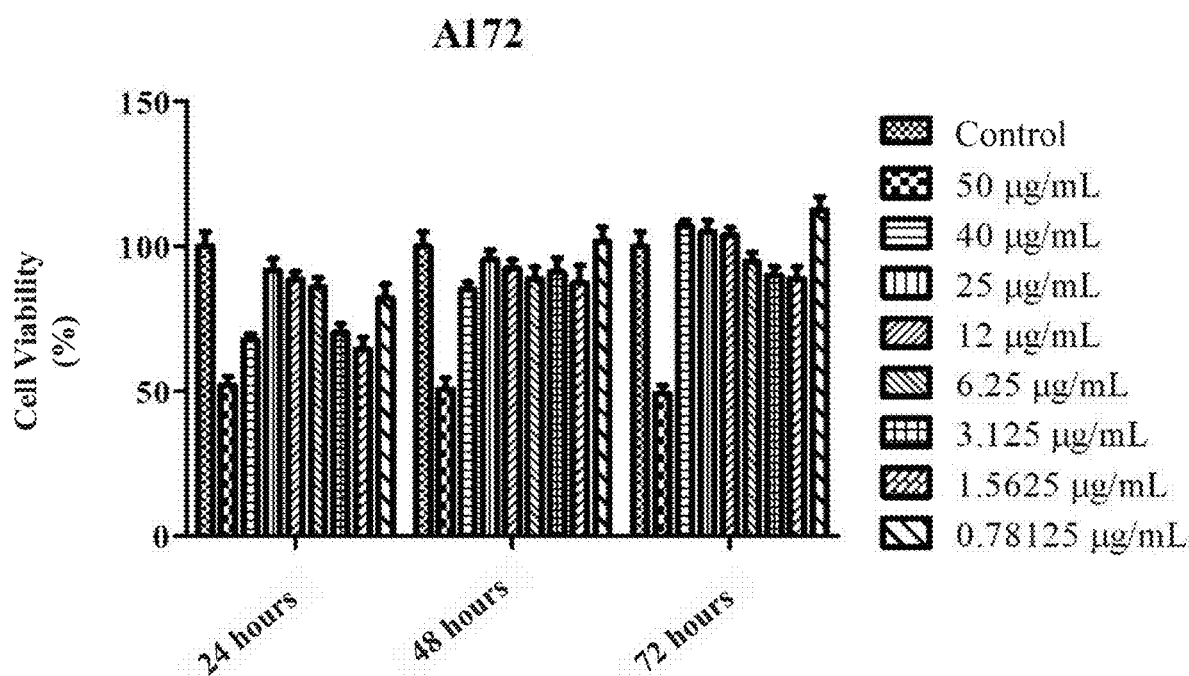
FIG. 4 is a graphical representation of the effect of the exosomes obtained from the *Leishmania infantum* parasites on the cell viability of the A172 cells administered for 24, 48 and 72 hours in 8 different doses.
Figure 5:
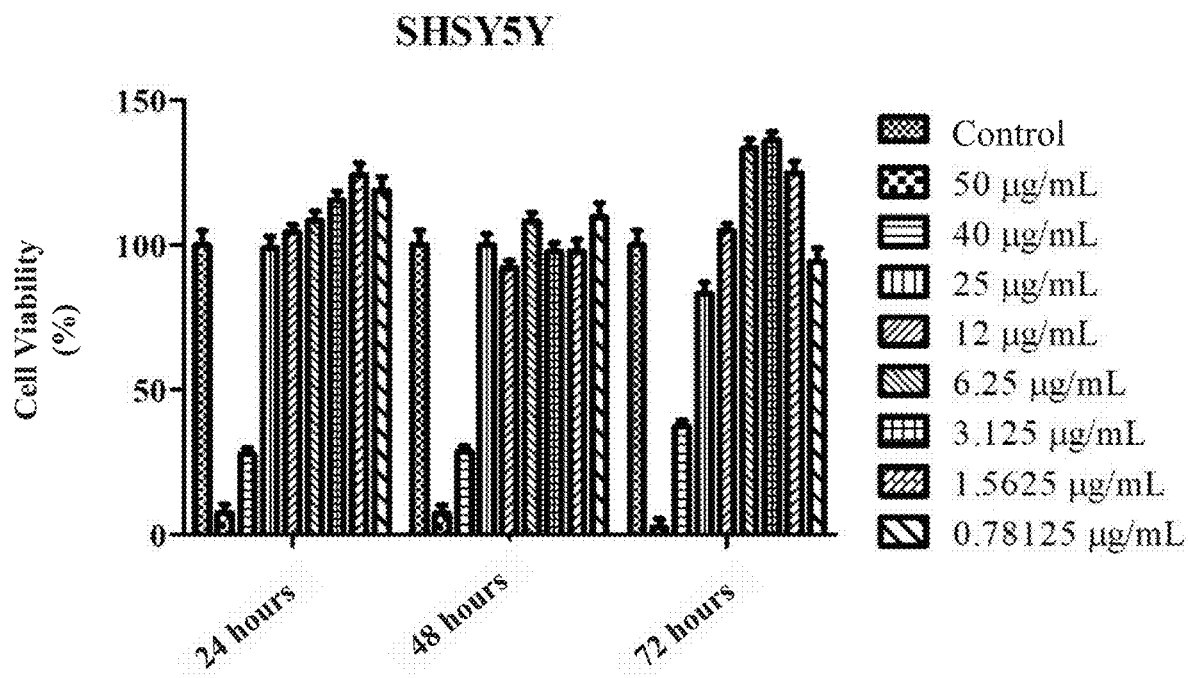
FIG. 5 is a graphical representation of the effect of the exosomes obtained from the *Leishmania infantum* parasites on the cell viability of the SHS5Y cells administered for 24, 48 and 72 hours in 8 different doses.
Figure 6:
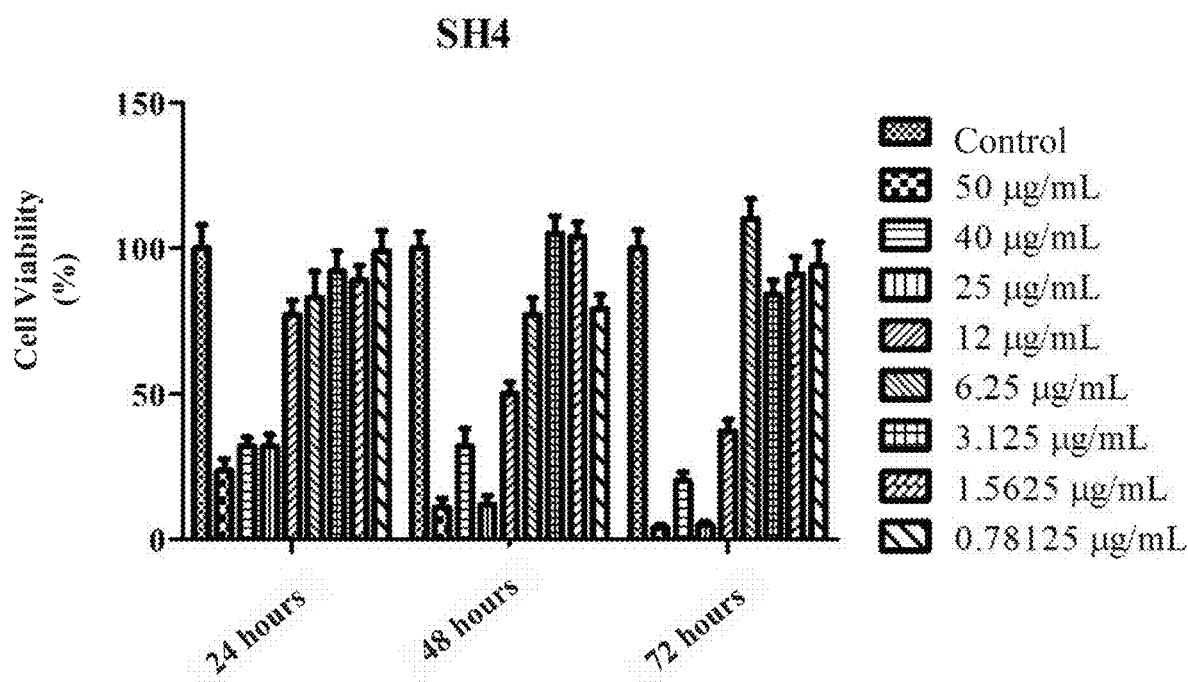
FIG. 6 is a graphical representation of the effect of the exosomes obtained from the *Leishmania infantum* parasites on the cell viability of the SH4 cells administered for 24, 48 and 72 hours in 8 different doses.
Figure 7:
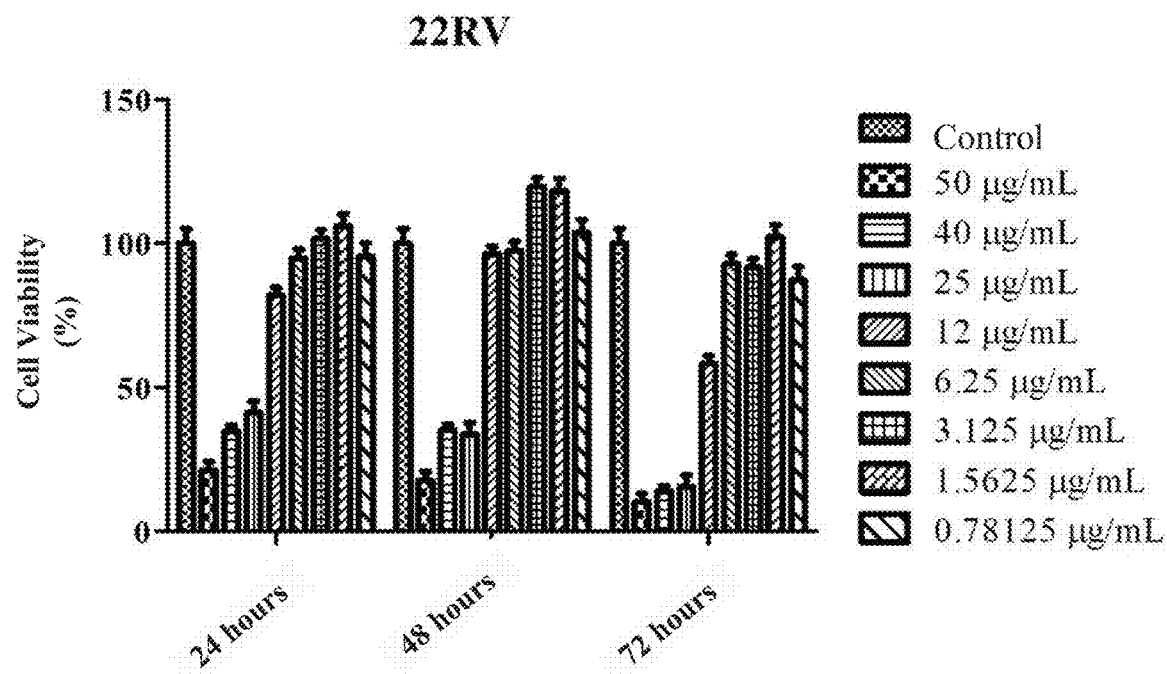
FIG. 7 is a graphical representation of the effect of the exosomes obtained from the *Leishmania infantum* parasites on the cell viability of the 22RV cells administered for 24, 48 and 72 hours in 8 different doses.
Figure 8:
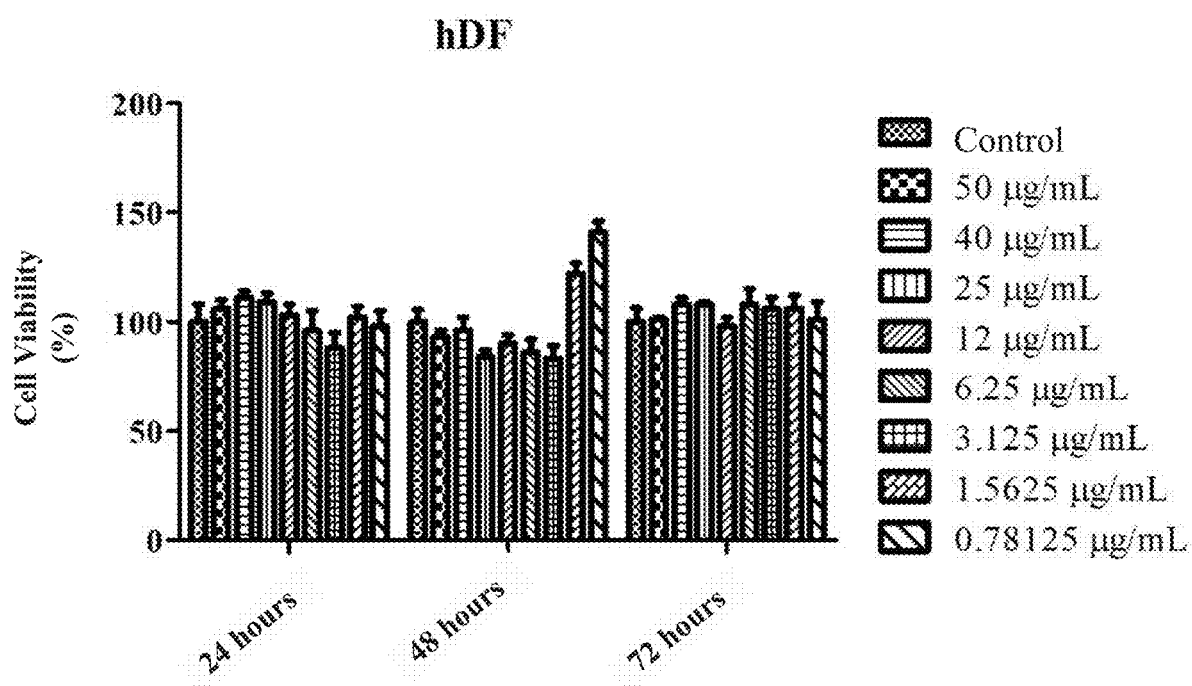
FIG. 8 is a graphical representation of the effect of the exosomes obtained from the *Leishmania infantum* parasites on the cell viability of the HDF cells administered for 24, 48 and 72 hours in 8 different doses.
Figure 9:
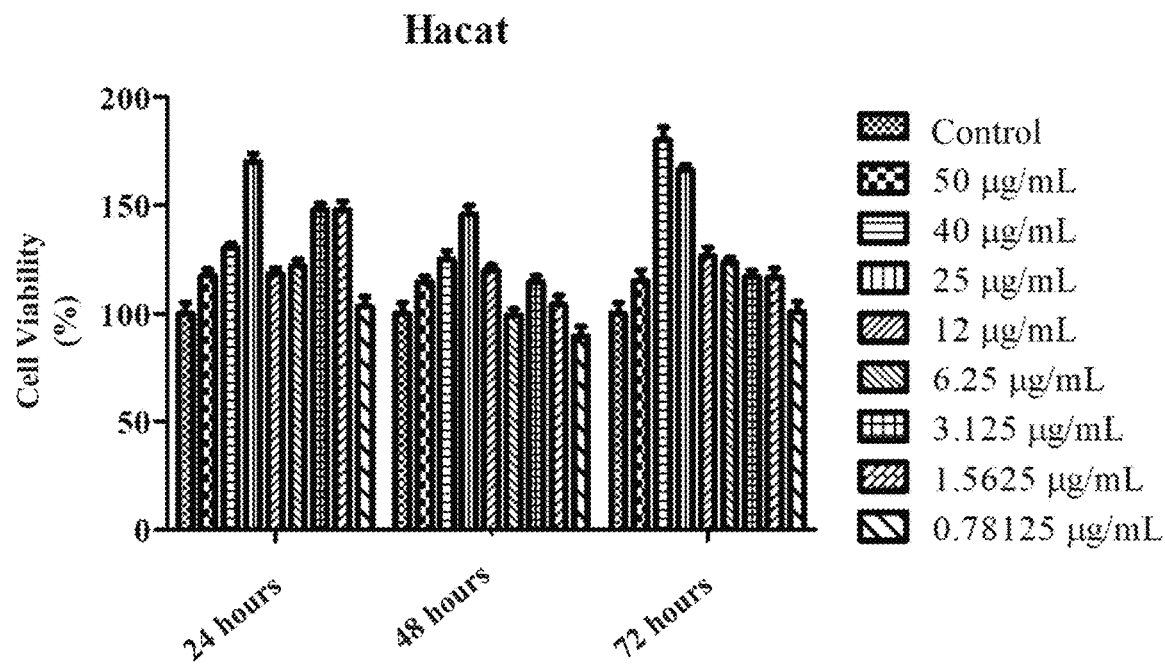
FIG. 9 is a graphical representation of the effect of the exosomes obtained from the *Leishmania infantum* parasites on the cell viability of the HaCaT cells administered for 24, 48 and 72 hours in 8 different doses.
Figure 10:
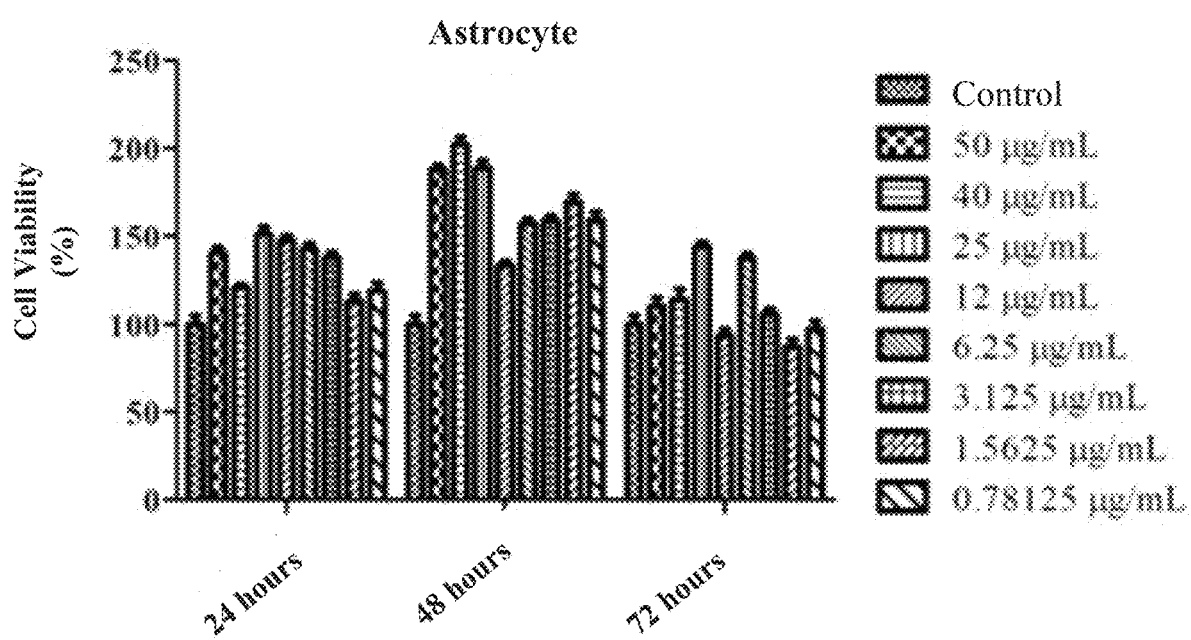
FIG. 10 is a graphical representation of the effect of the exosomes obtained from the *Leishmania infantum* parasites on the cell viability of the Astrocyte cells administered for 24, 48 and 72 hours in 8 different doses.
Figure 11:
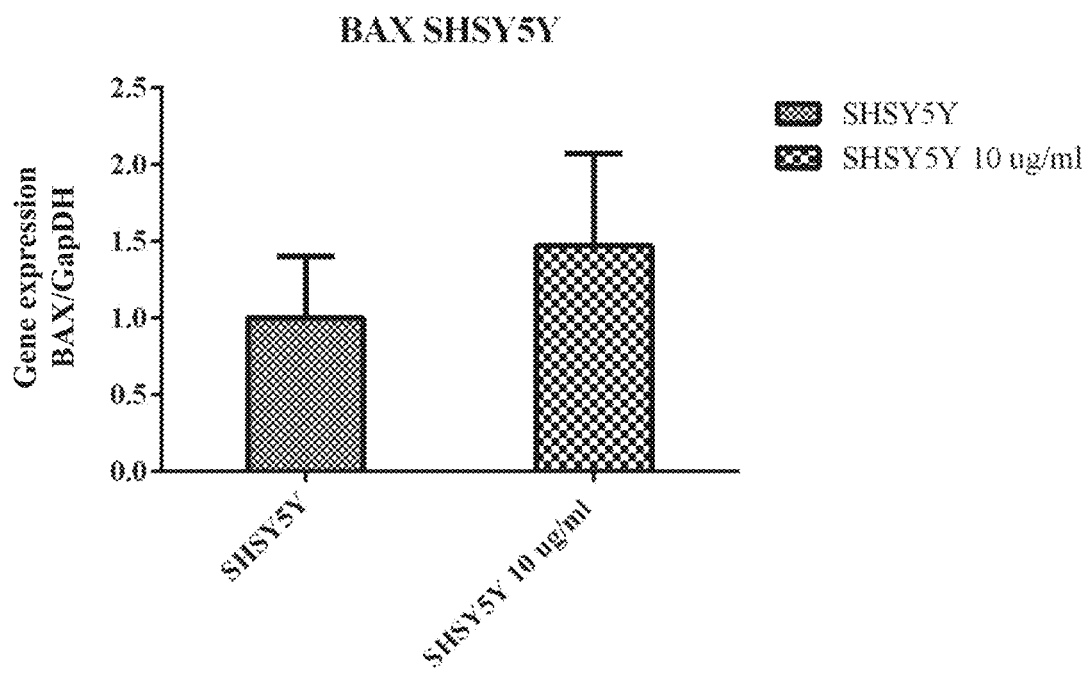
FIG. 11 is a graphical representation of the effect of the exosomes obtained from the *Leishmania infantum* parasites on the Bax gene expression in the SHSY5Y neuroblastoma cells administered for 48 hours in a single dose.
Figure 12:
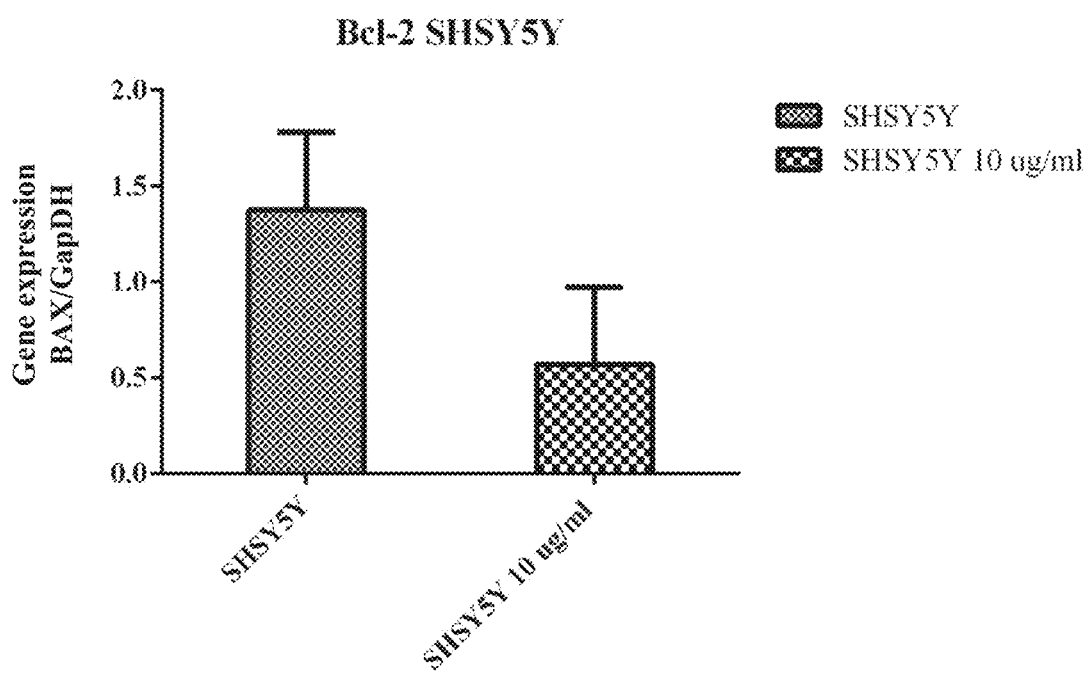
FIG. 12 is a graphical representation of the effect of the exosomes obtained from the *Leishmania infantum* parasites on the Bcl-2 gene expression in the SHSY5Y neuroblastoma cells administered for 48 hours in a single dose.
Figure 13:
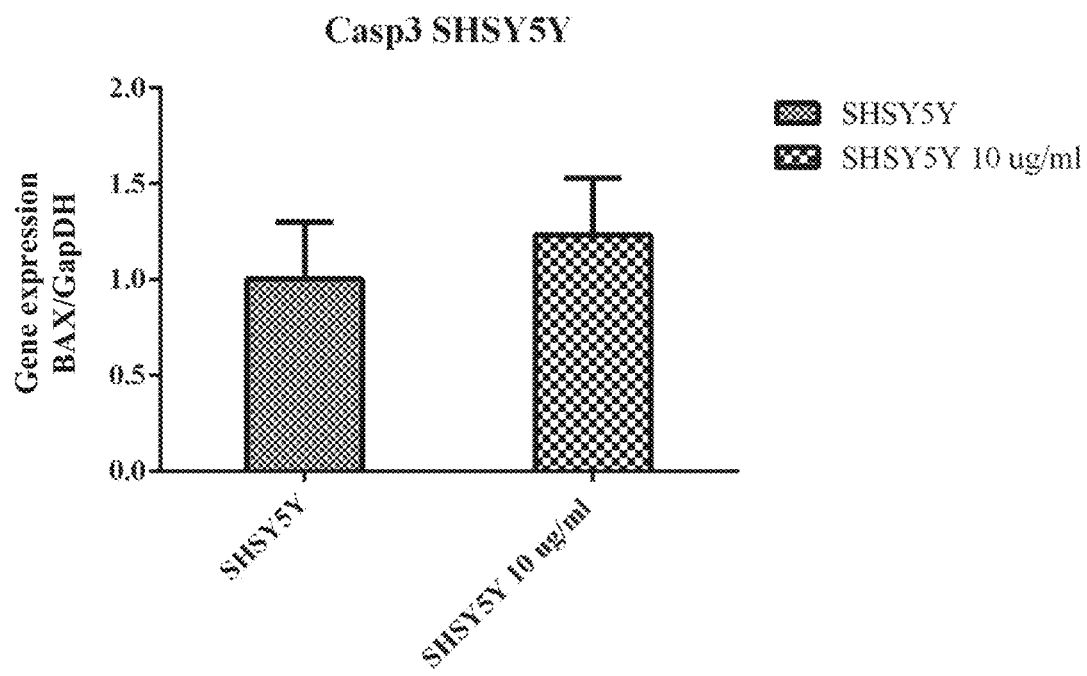
FIG. 13 is a graphical representation of the effect of the exosomes obtained from the *Leishmania infantum* parasites on the Caspase-3 gene expression in the SHSY5Y neuroblastoma cells administered for 48 hours in a single dose.
Figure 14:
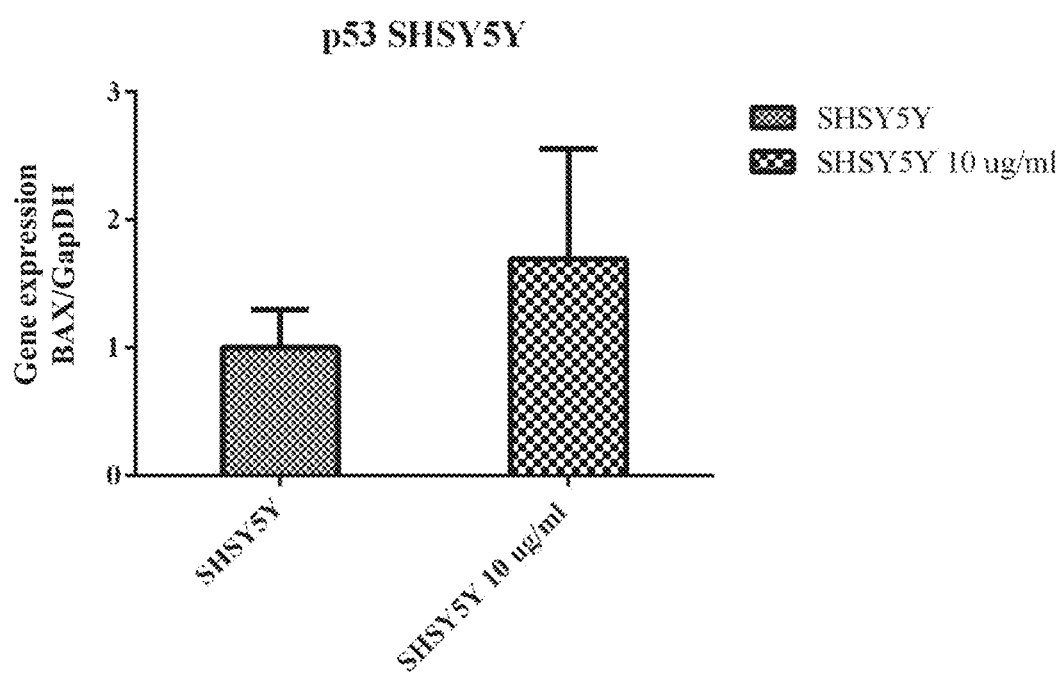
FIG. 14 is a graphical representation of the effect of the exosomes obtained from the *Leishmania infantum* parasites on the p53 gene expression in the SHS5Y neuroblastoma cells administered for 48 hours in a single dose.
Figure 15:
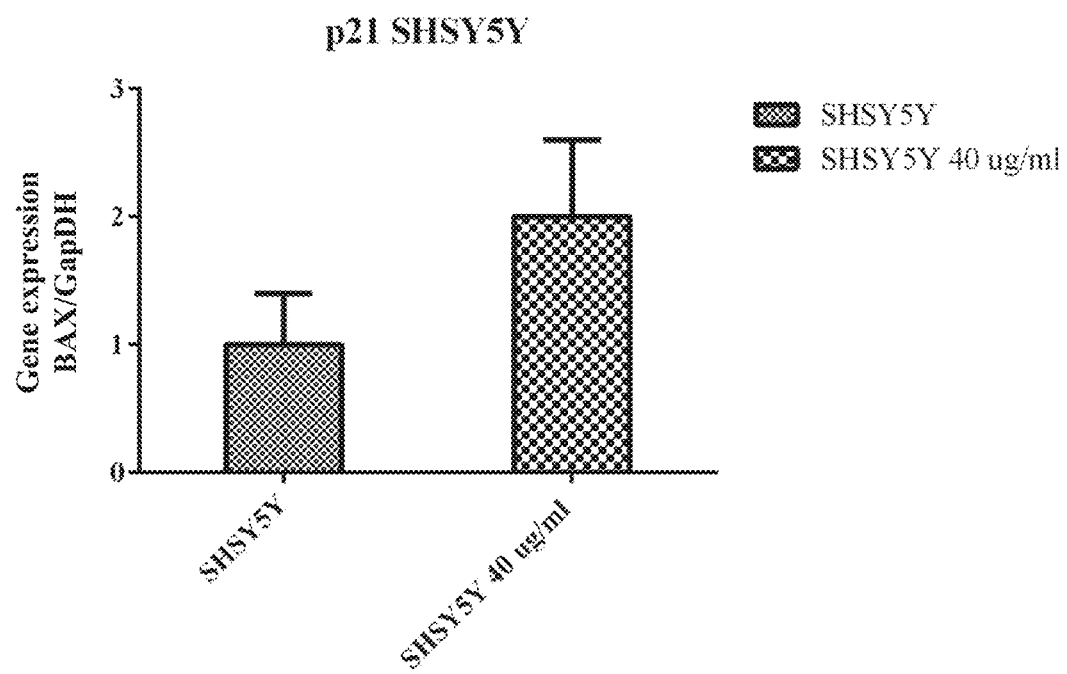
FIG. 15 is a graphical representation of the effect of the exosomes obtained from the *Leishmania infantum* parasites on the p21 gene expression in the SHSY5Y neuroblastoma cells administered for 3 hours in a single dose.
Figure 16:
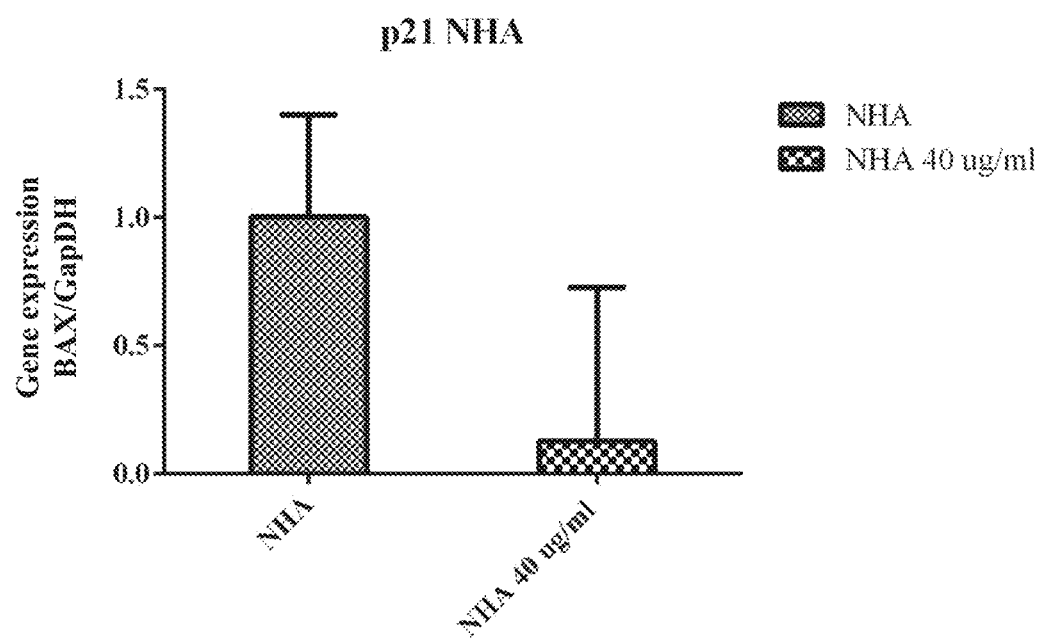
FIG. 16 is a graphical representation of the effect of the exosomes obtained from the *Leishmania infantum* parasites on the p21 gene expression in the Astrocyte cells administered for 3 hours in a single dose.
Figure 17:
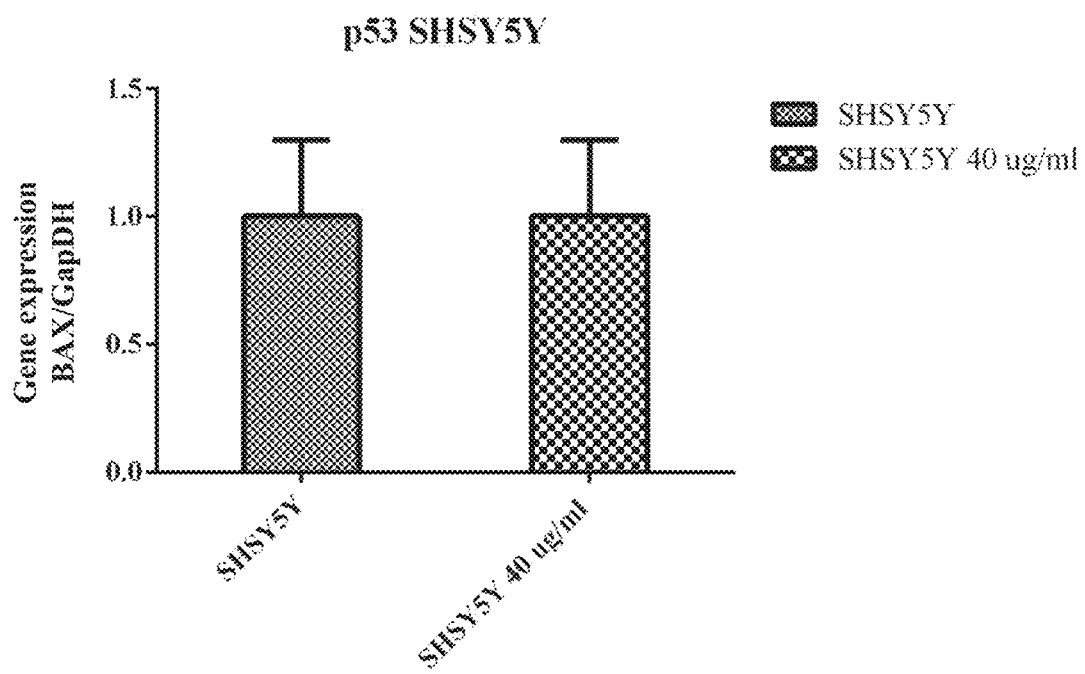
FIG. 17 is a graphical representation of the effect of the exosomes obtained from the *Leishmania infantum* parasites on the p53 gene expression in the SHSY5Y neuroblastoma cells administered for 3 hours in a single dose.
Figure 18:
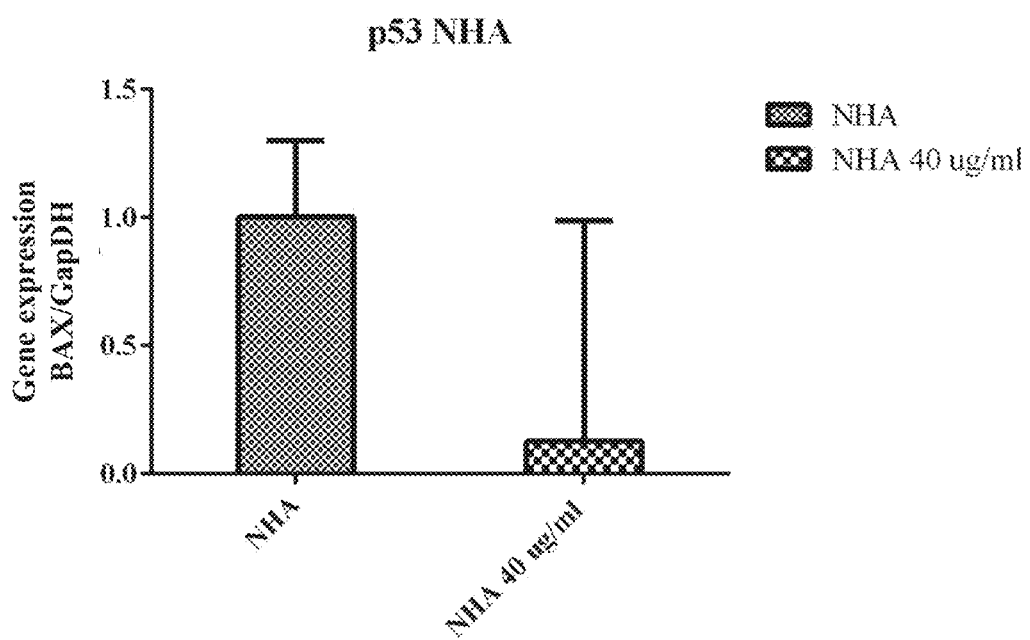
FIG. 18 is a graphical representation of the effect of the exosomes obtained from the *Leishmania infantum* parasites on the p53 gene expression in the Astrocyte cells administered for 3 hours in a single dose.
Figure 19:
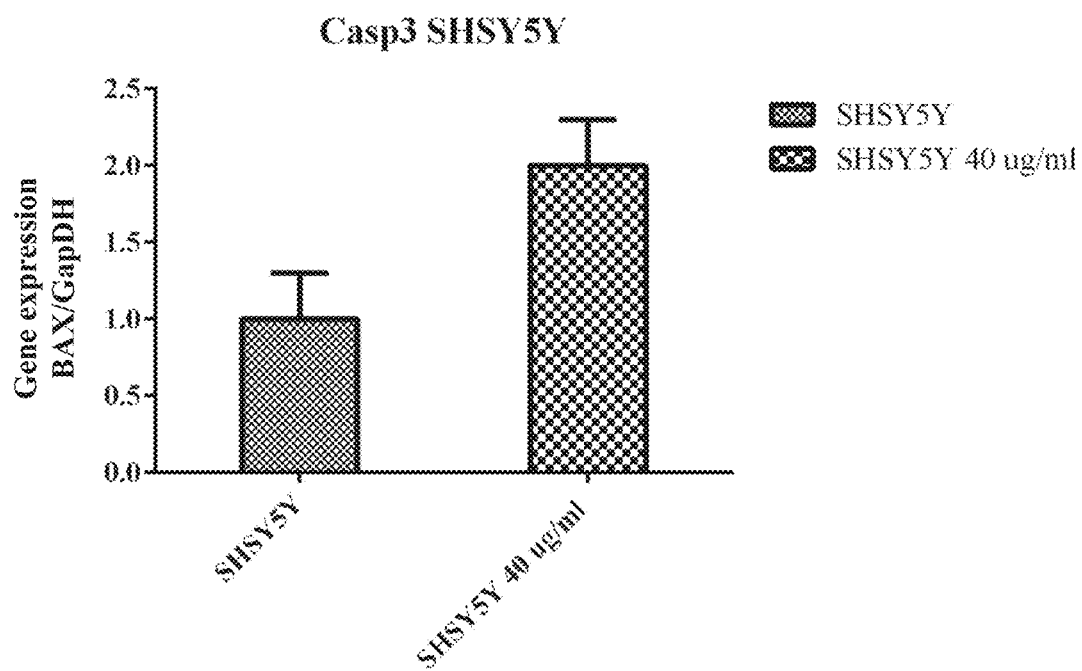
FIG. 19 is a graphical representation of the effect of the exosomes obtained from the *Leishmania infantum* parasites on the Caspase-3 gene expression in the SHSY5Y neuroblastoma cells administered for 3 hours in a single dose.
Figure 20:
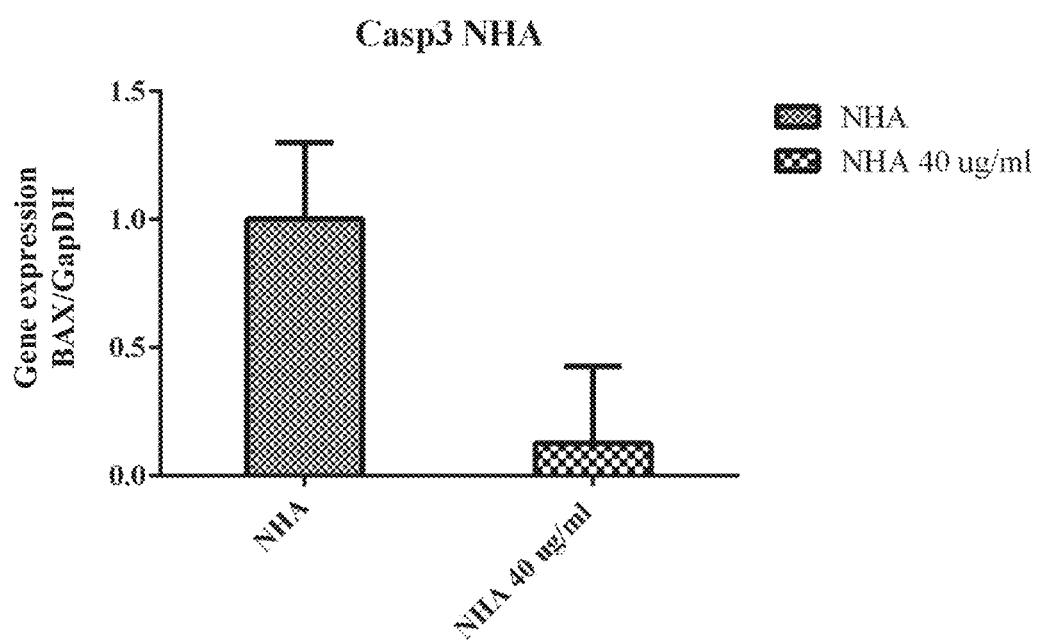
FIG. 20 is a graphical representation of the effect of the exosomes obtained from the *Leishmania infantum* parasites on the Caspase-3 gene expression in the Astrocyte cells administered for 3 hours in a single dose.

One of the differences of the present invention with respect to the state of the art is the use of the parasites and the exosomes isolated from the parasites, and it makes a significant difference both in terms of the species it is isolated from and in use of the exosomes of the parasites. These exosomes are only a part of the chemicals that are released by the cells outside of the cell. Within the scope of the invention, the activities of the parasites and their exosomes on both cancerous and healthy cell lines are shown. The parasites were applied on the glioblastoma U-87 cells both as 50-fold and 100-fold and the apoptosis rates, i.e. death rates, of the cancer cells were evaluated and at the end of 8 hours of incubation, up to 30% death was observed in both doses (FIG. 1). At the same time, the infection of the cells undergoing apoptosis, i.e. death, with *Leishmania infantum* parasites is approximately 68 percent (FIG. 2). Upon examination of cell viability for 3 days after applying not only the parasites but also thee exosomes that are secreted by these parasites and isolated from the medium are applied at certain concentrations (0.78-50 µg/ml) on certain cancerous and healthy cells; decrease in cell viability and apoptosis were observed in U87 glioblastoma cells (40% and above), SHSY5Y neuroblastoma cells (90%) and above), A172 glioblastoma cells (45% and above), SH4 melanoma cells (90% and above), 22RV prostate cells (90% and above), while no effect was observed on viability in HaCaT, HDF and Astrocyte cells which are the healthy cell lines (FIGS. 3-10).

A 10 µg/ml dose of exosomes was applied in SHSY-5Y Neuroblastoma cells, and after incubation for 48 hours, p53, caspase 3, Bcl-2 and Bax gene expressions were assayed by quantitative real-time polymerase chain reaction (RT-PCR); and as a result, significant increases in p53, caspase 3 and Bax gene expressions and a decrease in Bcl-2 gene expression were observed in SHSY-5Y Neuroblastoma cells (FIGS. 11-14). A 40 µg/ml dose of exosomes was applied in SHSY-5Y Neuroblastoma and Astrocyte (NHA) cells, and after incubation for 3 hours, the changes in the p21, p53 and caspase 3 gene expressions were evaluated; and significant increases in p21 and caspase 3 gene expressions were observed in SHSY-5Y Neuroblastoma cells while concluding that the p21, p53 and caspase 3 gene expressions decreased in Astrocyte (NHA) cells (FIGS. 15-20). The results obtained in the light of the experiments show that the present invention is suitable for development of a formulation that does not have a cytotoxic effect on healthy cells while causing death (apoptosis) in high amounts of cancer cells.

The advantages of the present invention can be expressed as follows:

The present invention exhibits almost complete activity in 24 hours on different types of cancer and has no side effects on healthy cells, Since parasites, especially *Leishmania* species, are extremely open to genetic modifications, the parasites and the extracellular vesicles of the parasites can be modified by genetic intervention according to need, they are open to improvements in their activities on cancer and production volume obtained from the parasites, Active substances can be loaded on exosomes by using the drug loading capacity of exosomes, and thus, by carrying specific drug to the target cell and thereby enhancing bioavailability of the drug, the desired effect is achieved in the tumor specific target region.

The extracellular vesicles used in the invention are products that can be produced in high volumes at affordable prices.

REFERENCES

[1]. Ferlay, J., et al., Cancer incidence and mortality worldwide: sources, methods and major patterns in GLOBOCAN 2012. International journal of cancer, 2015. 136(5): p. E359-E386.

[2]. Tao, J. J., K. Visvanathan, and A. C. Wolff, Long term side effects of adjuvant chemotherapy in patients with early breast cancer. The Breast, 2015. 24: p. S149-S153.

[3]. Nauts H C, Fowler G A and Bogatko F H: A review of the influence of bacterial infection and of bacterial products (coley's toxins) on malignant tumors in man; a critical analysis of 30 inoperable cases treated by coley's mixed toxins, in which diagnosis was confirmed by microscopic examination selected for special study. Acta Med Scand Suppl 1953; 276:1-103.

[4]. Atayde V D, Jasiulionis M G, Cortez M, Yoshida N: A recombinant protein based on *Trypanosoma cruzi* surface molecule gp82 induces apoptotic call death in melanoma cells. Melanoma Res 2008; 18:172-183.

[5]. Kallinikova V D, Matekin P V, Ogloblina T A, Leikina M I, Kononenko A F, Sokolova N M, Pogodina L S: [anticancer properties of flagellate protozoan *Trypanosoma cruzi* chagas, 1909]. Izv Akad Nauk Ser Biol 2001:299-311.

[6]. Kim J O, Jung S S, Kim S Y, Kim T Y, Shin D W, Lee J R, Lee Y H: Inhibition of lewis lung carcinoma growth by *Toxoplasma gondii* through induction of th1 immune responses and inhibition of angiogenesis. J Korean Med Sci 2007; 22:S38-46.

[7]. Lopez N C, Valck C, Ramirez G, Rodriguez M, Ribeiro C, Orellana J, Maldonado I, Albini A, Anacona D, Lemus D, Aguilar L, Schwaeble W, Ferreira A: Antiangiogenic and antitumor effects of *Trypanosoma cruzi* calreticulin. PLoS Negl Trop Dis 2010; 4: e730.

[8]. Roskin Gr, Exempliarskaia E: Protozoeninfektion and experimenteller Krebs. Z Krebsforsch 1931; 34:628-645.

[9]. Baird R. et al., Immune-mediated regression of established B16F10 melanoma by intratumoral injection of attenuated *Toxoplasma gondii* protects against rechallenge. J Immunol. 2013 Jan. 1; 190(1): 469-478. doi: 10.4049/jimmunol.1201209.

[10]. Bose D. et. al., Heat Killed Attenuated *Leishmania* Induces Apoptosis of HepG2 Cells Through ROS Mediated p53 Dependent Mitochondrial Pathway. Cell Physiol Biochem 2016; 38:1303-1318.

[11]. Yang Y. et al., Exosomes from *Plasmodium*-infected hosts inhibit tumor angiogenesis in a murine Lewis lung cancer model. Nature Oncogenesis (2017) 6, e351; doi: 10.1038/oncsis.2017.52.

[12]. Théry, C., L. Zitvogel, and S. Amigorena, Exosomes: composition, biogenesis and function. Nature Reviews Immunology, 2002, 2(8): p. 569.

[13]. Kahlert, C. and R. Kalluri, Exosomes in tumor microenvironment influence cancer progression and metastasis. Journal of molecular medicine, 2013. 91(4): p. 431-437.

[14]. Clayton, A. and M. D. Mason, Exosomes in tumour immunity. Current oncology, 2009. 16(3): p. 46.

[15]. Clayton, A., et al., Cancer exosomes express CD39 and CD73, which suppress T cells through adenosine production. The Journal of Immunology, 2011: p. 1003884.

[16]. Costa-Silva, B., et al., Pancreatic cancer exosomes initiate pre-metastatic niche formation in the liver. Nature cell biology, 2015. 17(6): p. 816.

[17]. Lee, J.-K., et al., Exosomes derived from mesenchymal stem cells suppress angiogenesis by down-regulating VEGF expression in breast cancer cells. PloS one, 2013. 8(12): p. e84256.

[18]. Viaud, S., et al., Dendritic cell-derived exosomes for cancer immunotherapy: what's next? Cancer research, 2010: p. 0008-5472. CAN-09-3276.

[19]. Escudier, B., et al., Vaccination of metastatic melanoma patients with autologous dendritic cell (DC) derived-exosomes: results of the first phase I clinical trial. Journal of translational medicine, 2005. 3(1): p. 10.

[20]. Raimondo, S., et al., Citrus limon-derived nanovesicles inhibit cancer cell proliferation and suppress CML xenograft growth by inducing TRAIL-mediated cell death. Oncotarget, 2015. 6(23): p. 19514.

What is claimed is:

1. A pharmaceutical composition for cancer treatment, wherein the composition comprises extracellular vesicles isolated from *Leishmania infantum*, wherein the extracellular vesicles are isolated from the *Leishmania infantum* via two-phase liquid system comprising following steps:

collecting a culture media of the *Leishmania infantum* parasite, wherein the extracellular vesicles are isolated from the parasite, centrifuging at a rate of 2,000 g to 10,000 g for 5-20 minutes for a removal of undesirable substances such as cell residues and the parasite from the culture media, removing particles of size 220 nm and above by a filtration after a centrifugation, transferring a vesicle-protein mixture obtained by the centrifugation into the ATPS containing a PEG phase and a DEX phase for separation f the vesicle-protein mixture, removing non-vesicular proteins, a cello fat and other impurities from the extracellular vesicles by utilizing a chemical tendency of the PEG phase to the non-vesicular proteins and the DEX phase to phospholipid structured membranes, obtaining isolated extracellular vesicles.

2. The pharmaceutical composition according to claim 1, comprising at least one active compound selected from the group consisting of active compounds showing an anti parasitic activity, an antibacterial activity, an antiviral activity, antineoplastic activity and/or a cytotoxic activity and/or an antimetastatic activity, and binary and ternary combinations thereof as a further active substance.

3. The pharmaceutical composition according to claim 2, comprising at least one agent selected from the group consisting of amikacin, gentamycin, kanamycin, neomycin, netilmicin, tobramycin, paromomycin, streptomycin, spectinomycin, geldanamycin, herbimycin, rifaximin, loracarbef, ertapenem, doripenem, imipenem, meropenem, cephadroxyle, cefazolin, cephalothin, cephalexin, cephaclor, cefamandole, cefoxitin, cefprozil, cefuroxime, cefixime, cefdinir, cefditoren, cefoperazone, cefotaxime, cefpodoxime, ceftazidime, ceftibuten, ceftizoxime, cefepime, ceftaroline fosamil, ceftobiprol, teicoplanin, vancomycin, televancin, dalbavancin, oritavancin, clindamycin, lincomycin, daptomycin, azitromycine, claritromycin, diritromycin, erythromycin, roxithromycin, troleandomycin, telithromycin, spiramycin, aztreonam, furazolidon, nitrofurantoin, linezolid, posizolid, radezolid, torezolid, amoxicillin, ampicillin, azlocillin, carbenicillin, cloxacillin, dicloxacillin, flucoxacillin, mezlocillin, methicillin, nafcillin, oxacillin, penicillin G, penicillin V, piperacillin, temocillin, ticarcillin, clavulanate, sulbactam, tazobactam, bacitracin, colistin, polymyxin B, ciprofloxacin, enoxacin, gatifloxacin, gemifloxacin, levofloxacin, lomefloxacin, moxifloxacin, nalidinic acid, norfloxacin, ofloxacin, trovafloxacin, grepafloxacin, sparfloxacin, temafloxacin, mafenide, sulfacetamide, sulfadiazine, sulfadimethoxine, sulfamethizole, sulfamethoxazole, sulfanilamide, sulfasalazine, sulfisoxazole, trimethoprim, demeclocycline, doxycycline, minocycline, oxytetracycline, tetracycline, clofazimine, dapsone, capreomycin, cycloserine, ethambutol, isoniazid, pyrazinamide, rifampicin, rifabutin, rifapentine, streptomycin, arsphenamine, chloramphenicol, phosphomycin, fusidic acid, metronidazole, mupirocin, platensimycin, quinupristin, dalfopristin, thiamphenicol, tigecycline, tinidazole, trimethoprim, and binary or ternary combinations and/or encapsulations thereof as the active compound showing the antibacterial activity.

4. The pharmaceutical composition according to claim 2, comprising at least one agent selected from the group consisting of abacavir, acyclovir, adefovir, amantadine, amprenavir, ampligen, arbidol, atazanavir, atripla, balavir, sidofovir, kombivir, dolutegravir, darunavir, delavirdin, didanosine, docosanol, eduksudine, efavirenz, emtricitabine, enfuvirtide, entecavir, ecoliver, famciclovir, fomivirsen, fosamprenavir, foscarnet, phosphonet, ganciclovir, ibasitabin, imunovir, idoxuridine, imiquimod, indinavir, inosine, interferon type I, interferon type II, interferon type III, interferon, lamivudine, lopinavir, lovirid, maravirok, moroxidine, methisazone, nelfinavir, nevirapine, nexavir, nitazoxanide, novir, oseltamivir, peginterferon alfa-2a, pensiclovir, peramivir, plekonaril, podofilotoxin, protease inhibitor, nucleoside analogues, ralgetavir, ribavirin, rimantadine, ritonavir, pyramidine, saquinavir, sofoshuvir, stavudine, telaprevir, tenofovir, tipranavir, trifluridine, trisivir, tromantadine, trovada, valaciclovir, valganciclovir, vidarabine, viramidine, zalcitabine, zanamivir, zidovudine, and binary or ternary combinations and/or encapsulations thereof as the active compound showing the antiviral activity.

5. The pharmaceutical composition according to claim 2, comprising at least one agent selected from the group consisting of nitazoxanide, melarsoprol, eflornithine, nietronidazol, tinidazole, miltefosine, mebendazole, pyrantel pamoate, thiabendazole, diethylcarbamazine, ivermectin, niclosamide, praziquantel, albendazole, rifampin, amphotericin B, fumagillin, furazolidone, nifursemizone, nitazoxanide, ornidazole, paromomycin sulfate, pentamidine, pirimethamine, tinidazole, albendozole, mebendazole, thiabendazole, fenbendazole, triclabendazole, flubendazole, abomectin, diethylcarbamazine, ivermectin, suramin, pyrantel pamoate, levamisole, niclosamide, nitazoxanide, oxyclozonide, monepantel, derquantel, amphotericin B, urea stibamine, sodium stibogluconate, meglumine antimoniate, paromomycin, miltefosine, fluconazole, pentamidine, and binary or ternary combinations and/or encapsulations thereof as the active compound showing the antiparasitic activity.

6. The pharmaceutical composition according to claim 2, comprising at least one agent selected from the group consisting of cyclophosphamide, ifosfamide, temozolomide, capecitabine, 5-fluorouracil, methotrexate, gemcitabine, pemetrexed, mitomycin, bleomycin, epirubicin, doxorubicin, etoposide, paclitaxel, irinotecan, docetaxel, vincristine, carboplatin, cisplatin, oxaliplatin bevacizumab, cetuximab, gefitinib, imatinib, trastuzumab, denosumab, rituximab, sunitinib, zoledronate, abiraterone, anastrozole, bicalutamide, exemestane, goserelin, medroxyprogesterone, octreotide, tamoxifen, bendamustine, carmustine, chlorambucil, lomustine, melphalan, procarbazine, streptozocin, fludarabine, raltitrexed, actinomycin D, dactinomycin, doxorubicin, mitoxantrone, eribulin, topotecan, vinblastine, vinorelbine, afatinib, aflibercept, crizotinib, dabrafenib, interferon, ipilimumab, lapatinib, nivolumab, panitumumab, pembrolizumab, pertuzumab, sorafenib, trastuzumab emtansine, temsorilimus, vemurafenib, ibandronic acid, pamidronate, bexarotene, buserelin, cyproterone, degarelix, folinic acid, fulvestrant, lanreotide, lenalidomide, letrozole, leuprorelin, megestrol, mesna, thalidomide, vincristine, and binary or ternary combinations and/or encapsulations thereof as the active compound showing the antineoplastic activity in combination with the extracellular vesicles and/or the nano-carrier systems.

7. The pharmaceutical composition according to claim 2, comprising at least one active substance.

8. The pharmaceutical composition according to claim 2, wherein the composition is administered by parenteral, intravenous, intradermal, subcutaneous, intraperitoneal, topical, intrathecal, intranasal, intracerebroventricular, ocular, vaginal, urethral, transdermal, sublingual, subarachnoid, rectal, periodontal, perineural, peridural, periarticular, oral, intratympanic, intratumor, intrapulmonary, intrasynovial, intramuscular, intraovarian, intrameningeal, intracorporus cavernosum, intracoronary, intracerebral, epidural, cutaneous, buccal, or dental administration route.

9. The pharmaceutical composition according to claim 2, wherein the pharmaceutical composition is formed by incorporating the extracellular vesicles obtained from *Leishmania infantum* into at least one of aluminum hydroxide, aluminum phosphate, tocopherol, emulsion systems containing 3D-MPL, cholesterol, CG oligonucleotide; or combinations of two or more of the aluminum hydroxide, the aluminum phosphate, the tocopherol, the emulsion systems containing 3D-MPL, the cholesterol, the CG oligonucleotide.

10. The pharmaceutical composition according to claim 1, comprising nano-carrier systems selected from the group consisting of the extracellular vesicles, emulsion systems, biological and chemical nanoparticles, inorganic nanoparticles, lipid vesicular systems, dendrimers, polymer-drug conjugates, micelles, and carbon nanotubes, wherein the biological and chemical nanoparticles are polymeric nanoparticles, or solid lipid nanoparticles, the inorganic nanoparticles are metallic nanoparticles, and the lipid vesicular systems are liposomes, niosomes and ethosomes.

* * * * *